US009667936B2

(12) United States Patent
Nemeckay et al.

(10) Patent No.: US 9,667,936 B2
(45) Date of Patent: May 30, 2017

(54) CREATING AND CUSTOMIZING A COLORABLE IMAGE OF A USER

(71) Applicant: Crayola, LLC, Easton, PA (US)

(72) Inventors: Brian Edward Nemeckay, Belvidere, NJ (US); Kyle Kelly, Bethlehem, PA (US)

(73) Assignee: Crayola, LLC, Easton, PA (US)

(*) Notice: Subject to any disclaimer, the term of this patent is extended or adjusted under 35 U.S.C. 154(b) by 174 days.

(21) Appl. No.: 14/701,020

(22) Filed: Apr. 30, 2015

(65) Prior Publication Data

US 2015/0319376 A1   Nov. 5, 2015

Related U.S. Application Data

(60) Provisional application No. 61/986,352, filed on Apr. 30, 2014.

(51) Int. Cl.
| | |
|---|---|
| *H04N 9/75* | (2006.01) |
| *H04N 5/275* | (2006.01) |
| *G06F 3/01* | (2006.01) |
| *G06T 19/00* | (2011.01) |
| *G06T 1/00* | (2006.01) |
| *H04N 1/387* | (2006.01) |

(Continued)

(52) U.S. Cl.
CPC ............ *H04N 9/75* (2013.01); *G06F 3/011* (2013.01); *G06T 1/0007* (2013.01); *G06T 5/004* (2013.01); *G06T 7/11* (2017.01); *G06T 7/194* (2017.01); *G06T 19/006* (2013.01); *H04N 1/387* (2013.01); *H04N 1/3878* (2013.01); *H04N 5/275* (2013.01); *G06T 2207/10004* (2013.01); *G06T 2207/10024* (2013.01); *G06T 2207/20048* (2013.01); *G06T 2207/30196* (2013.01); *H04N 2005/2726* (2013.01)

(58) Field of Classification Search
None
See application file for complete search history.

(56) References Cited

U.S. PATENT DOCUMENTS

| | | | | |
|---|---|---|---|---|
| 5,986,718 | A | * | 11/1999 | Barwacz ................... H04N 9/75 345/634 |
| 2005/0231513 | A1 | * | 10/2005 | LeBarton ................. G06T 13/00 345/473 |

(Continued)

OTHER PUBLICATIONS

"Crayola Lights, Camera, Color!" Release information for iOS (iPhone/iPad) retrieved on Sep. 8, 2015, 3 pages available at: www.gamefaqs.com/iphone/655429-crayola-lights-camera-color/data.

(Continued)

*Primary Examiner* — Maurice L McDowell, Jr.
(74) *Attorney, Agent, or Firm* — Shook, Hardy & Bacon L.L.P.

(57) ABSTRACT

The invention provides, among other things, methods and systems for creating a customized colorable image of a user. An exemplary method may include receiving an indication of a selected colorable background. The method may further include capturing a real-time image of the user, where the user is adjacent to a predetermined background. An image of the predetermined background may be filtered out of the real-time image of the user to generate a filtered real-time image of the user. Then, the filtered real-time image of the user against the selected colorable background may be presented.

20 Claims, 8 Drawing Sheets

(51) Int. Cl.
*G06T 5/00* (2006.01)
*G06T 7/11* (2017.01)
*G06T 7/194* (2017.01)
*H04N 5/272* (2006.01)

(56) References Cited

U.S. PATENT DOCUMENTS

| | | | | |
|---|---|---|---|---|
| 2006/0204137 A1* | 9/2006 | Shimoda | ............. | G06T 11/60 |
| | | | | 382/298 |
| 2011/0316853 A1* | 12/2011 | Bar-Zeev | ............. | G06T 15/20 |
| | | | | 345/420 |
| 2012/0268552 A1* | 10/2012 | Choi | ............. | H04N 7/147 |
| | | | | 348/14.07 |
| 2014/0267310 A1* | 9/2014 | Moll | ............. | G06T 13/20 |
| | | | | 345/473 |

OTHER PUBLICATIONS

Crayola Playzone, "Lights, Camera, Color!" 3 pages, retrieved on Sep. 9, 2015, available at: www2.crayola.com/play-zone/play.cfm?siteID=1&appID=1#/LCC.

* cited by examiner

CREATING AND CUSTOMIZING A COLORABLE IMAGE OF A USER

CROSS REFERENCE TO RELATED APPLICATION

This application claims priority to U.S. Provisional Application Ser. No. 61/986,352, filed Apr. 30, 2014, entitled "Creating and Customizing a Colorable Image of a User," the entire contents of which is hereby incorporated by reference.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed description section below. This summary is not intended to identify key features or essential features of the claimed subject matter, nor is it intended to be used as an aid in isolation to determine the scope of the claimed subject matter.

In brief and at a high level this disclosure describes, among other things, creating a customized, colorable image of a user. The customized, colorable image of the user may provide the effect that the user is in a coloring book page. In embodiments, the user selects a colorable background to be included in the customized coloring book page. Then, a real-time image, such as a live video image, of the user may be captured, and a real-time image of the user against the selected colorable background may be presented. In embodiments, the real-time image that is presented includes a colorable image of the user. In such embodiments, the presented image resembles a live coloring book page. When the user has positioned and/or oriented himself as desired with respect to the colorable background, a static colorable image, such as an image resembling a digital photograph, may be captured and/or generated. Such static colorable image may include a colorable image of the user against the selected colorable background. This static colorable image may then be printed to produce a customized coloring book page featuring a colorable image of the user.

DESCRIPTION OF THE DRAWINGS

Illustrative embodiments of the invention are described in detail below with reference to the attached drawing figures, and wherein.

DETAILED DESCRIPTION

Figure 1A:
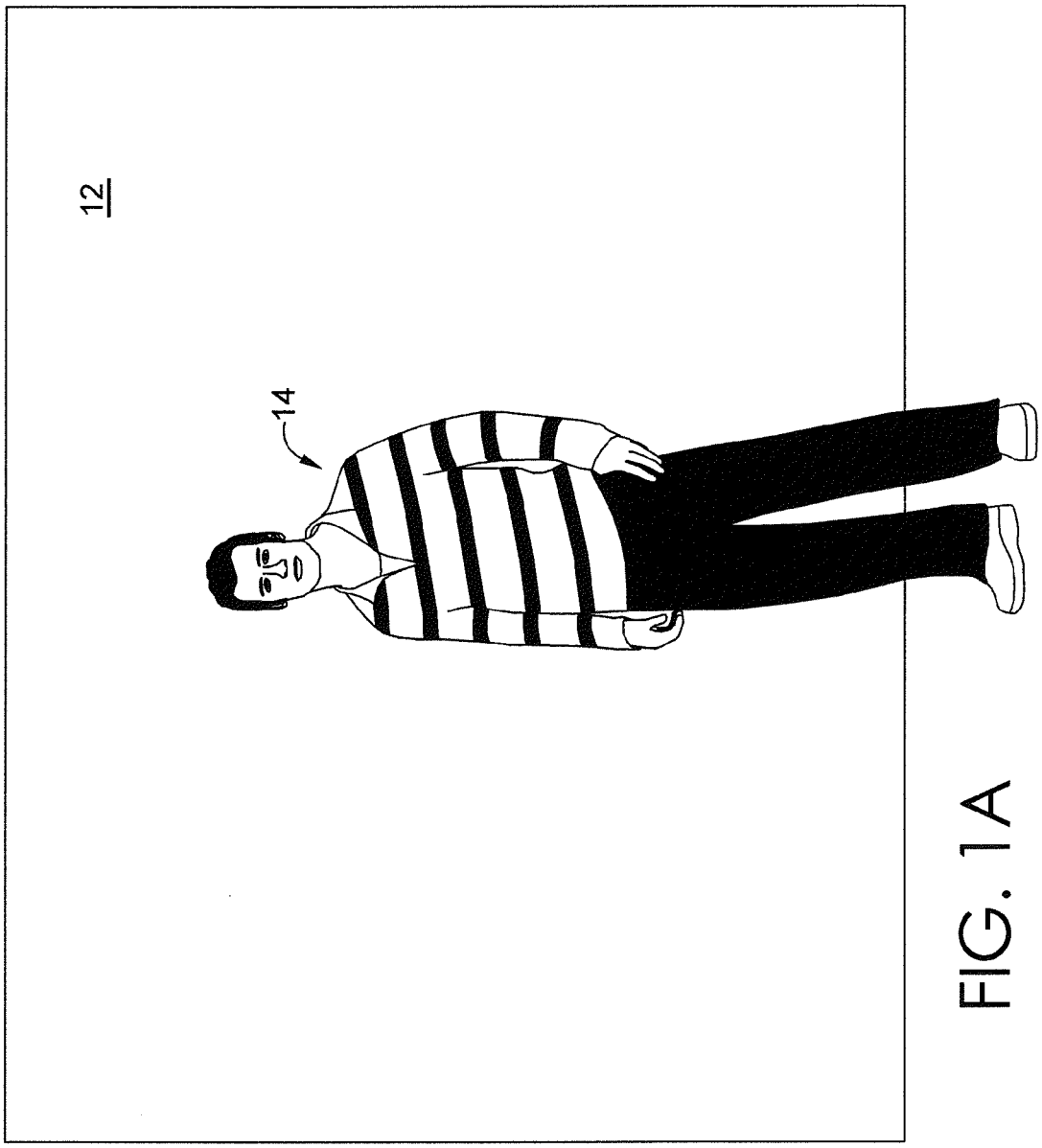
FIG. 1A is a first perspective view of an interactive environment for creating a customized, colorable image of a user, in accordance with an embodiment of the invention.

The subject matter of select embodiments of the invention is described with specificity herein to meet statutory requirements. But the description itself is not intended to necessarily limit the scope of the claims. Rather, the claimed subject matter might be embodied in other ways to include various components, steps, or combinations thereof similar to the ones described in this document. Terms should not be interpreted as implying any particular order among or between various steps herein disclosed unless and except when the order of individual steps is explicitly described.

Embodiments of the invention include a method for providing a customized colorable image of a user. The method may include receiving an indication of a selected colorable background. The method may further include capturing a real-time image of the user, where the user is adjacent to a predetermined background. An image of the predetermined background may be filtered out of the real-time image of the user to generate a filtered real-time image of the user. Then, the filtered real-time image of the user against the selected colorable background may be presented.

In a further embodiment, an interactive system for creating a customized, colorable image of a user is provided. The system may include a camera component for capturing a real-time image of the user positioned in association with a predetermined background. An image adjustment component may generate a real-time colorable image of the user. The system may further include a colorable background component for providing a colorable background. Finally, a presentation component may present the real-time colorable image of the user against the colorable background.

In yet another embodiment, the present invention includes a method for providing a customized, colorable image of a user. The method may include receiving a selection of a colorable background based on a first user input. A real-time image of the user positioned adjacent to a green screen may be captured, and the green screen may be filtered out of the real-time image of the user to provide a filtered image of the user. Based on the filtered image of the user, a real-time colorable image of the user may be generated. Furthermore, based on the real-time colorable image of the user and the received selection of the colorable background, the method may include presenting, in real time, an altered image corresponding to a minor image of the real-time colorable image of the user against the selected colorable background. The method may additionally include receiving a second user input indicating a command to capture a static colorable image of the user against the selected colorable background. In another step, the static colorable image of the user against the selected colorable background may be captured. The static colorable image of the user against the selected colorable background may be presented. Such static colorable image may correspond directly to the real-time colorable image of the user against the selected colorable background. The method may further include automatically printing the static colorable image in response to a third user input.

With reference now to the figures, methods and systems for providing a customized, colorable image of a user are described in accordance with embodiments of the invention. Various embodiments are described with respect to the figures in which like elements are depicted with like reference numerals.

Turning initially to FIG. 1A, a first perspective view of an exemplary interactive environment 10 for creating a customized, colorable image of a user is illustrated in accordance with an embodiment of the invention. This environment 10 may be incorporated into an interactive exhibit for users, in which a user creates a customized coloring book page featuring a colorable image of the user. Thus, the user can be the star of his own coloring page.

As shown in the environment 10, a user 14 may be positioned adjacent to a predetermined background 12 included in the environment 10. In embodiments, the predetermined background 12 is a green screen. The user 14 may stand, sit, or otherwise position himself in a desired manner with respect to the predetermined background 12. In embodiments, the interactive environment 10 includes an indication of an optimal position for the user 14. For example, a portion of the floor may be marked to indicate an area in which the user 14 should stand, sit, or otherwise position himself in order to obtain optimal results for the coloring page.

Figure 1B:
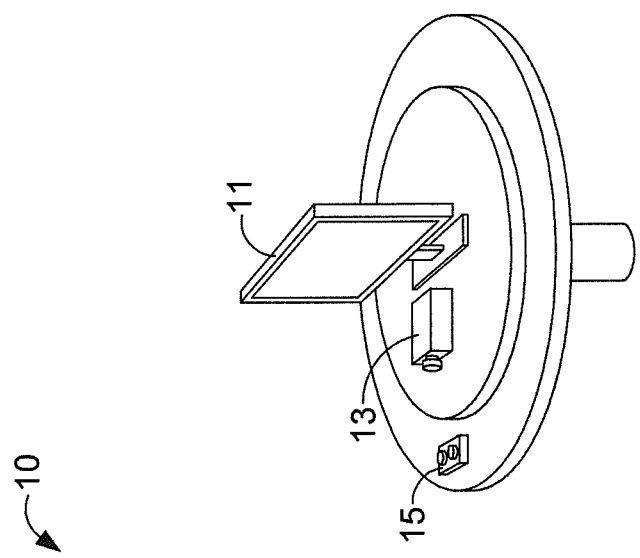
FIG. 1B is a second perspective view of an interactive environment for creating a customized, colorable image of a user, in accordance with an embodiment of the invention.
Figure 1B:
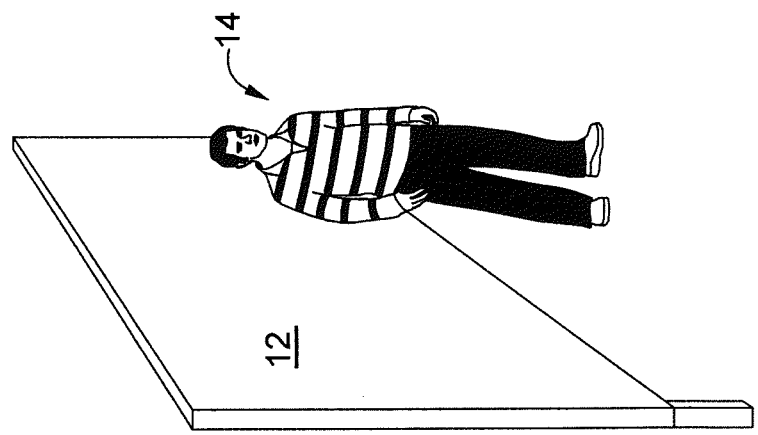

FIG. 1B provides a second view of the exemplary interactive environment 10. As shown in FIG. 1B, the environment 10 may include a camera component 13 for capturing a real-time image of the user 14 positioned adjacent to the predetermined background 12. The camera component 13 may be a video camera, for example. The environment 10 of FIG. 1B may also include a presentation component 11, which may present the real-time image of the user 14 that is captured by the camera component 13. The presentation component 11 may be an electronic visual display, such as a video display. In embodiments, the presentation component 11 is a flat panel display, such as a flat screen monitor or a flat screen television display. Together, the camera component 13 and the presentation component 11 may be configured to capture and present a high-definition image. The presentation component 11 may be positioned with respect to the user 14 in such a way that allows the user 14 to view a real-time image of himself on the presentation component 11 while adjacent to the predetermined background 12. In this way, the presentation component 11 may present a live video feed of an image of the user 14 for viewing by the user 14. In the exemplary interactive environment 10 of FIG. 1B, the camera component 13 and the presentation component 11 are positioned opposite of the predetermined background 12, such that when the user 14 is oriented with his back directly adjacent to the predetermined background 12, the user 14 may easily view the presentation component 11.

The interactive environment 10 may further include a receiving component 15 for receiving user inputs. As illustrated in FIG. 1B, the receiving component 15 may include one or more buttons for receiving user input. This receiving component 15 and the user inputs that may be received are discussed in more detail below.

Figure 2:
FIG. 2 is a front view of an exemplary presentation of a filtered image of a user against a colorable background, in accordance with an embodiment of the invention.

Turning next to FIG. 2, a perspective view of an exemplary presentation 16 of a filtered real-time image 17 is provided in accordance with an embodiment of the invention. At least a portion of the filtered real-time image 17 may correspond to the real-time image of the user 14 that is captured by the camera component 13 of FIG. 1B. The filtered real-time image 17 may be a live video image, and may be presented on the presentation component 11 of FIG. 1B.

As shown in the filtered real-time image 17 of FIG. 2, the predetermined background 12 of FIGS. 1A-1B has been filtered out of a real-time image of the user 14 to provide a filtered real-time image of the user 22. The filtered real-time image of the user 22, in embodiments, is analogous to a cut-out image of the user 14, where an image of the predetermined background 12 has been removed, leaving only an image of the user 14 behind. This filtering may be accomplished using green screen technology. The filtered real-time image of the user 22 may be presented in real time, such as by presenting a live video of the filtered real-time image of the user 22. Such presentation may occur at the presentation component 11 of FIG. 1B.

In place of the predetermined background 12, a colorable background 18 is included in the filtered real-time image 17. The colorable background 18 includes colorable elements, such as colorable element 20. As used herein, "colorable" may be used to refer to an image that is capable of being colored. For example, a user might use various art supplies (e.g., crayon, markers, pencils, or paints) to add color to the image. As such, a colorable element may be characterized by a dark edge that outlines a lighter interior of the colorable element. For example, colorable element 20 includes a black outline of a pirate hat, such that the shape of the pirate hat is defined and such that a user may color the pirate hat, itself, any color that is desired.

The colorable background 18 may be automatically selected. For example, the colorable background 18 may be automatically selected without user input, such as by random selection. Additionally or alternatively, the colorable background 18 may be selected in response to a user input. A user input regarding the selection of the colorable background 18 may be received at the receiving component 15 of FIG. 1B. The user 14 may view a number of different colorable background options before selecting the desired colorable background 18. The colorable background options may include any number of themes, scenes, and/or settings. For example, the colorable background options might depict scenes from the indoors, outdoors, ocean, jungle, desert, outer space, underground, mountains, or any other scene that can be imagined. The colorable background options might further include adventure scenes based on movies, television shows, comic books, books, or any other adventure scene. The colorable background options might also correspond to a historical era, such as prehistoric or medieval times, or to a futuristic setting. Additionally, the colorable background might include cartoon characters, such as the Crayola® Pip-Squeaks™ characters. Thus, the colorable background 18 is customizable in embodiments.

As mentioned the filtered real-time image of the user 22 against the selected colorable background 18, which may include colorable elements such as the colorable element 20, may be presented at the presentation component 11. In some embodiments, a minor image of the filtered real-time image of the user 22 against the selected colorable background is presented at the presentation component 11. In this way, the user 14 may view the real-time image and intuitively orient and/or reposition himself with respect to the colorable background 18. For example, the user 14 may wish to orient and/or reposition himself such that he does not block a particular colorable element, such as the colorable element 20. The user 14 may further wish to orient and/or reposition himself such that he appears to be interacting with the colorable background 18 or a particular colorable element thereof. The user 14 may move accordingly, using the minor image presented on the presentation component 11 as a minor to guide his movements. The mirror image may be particularly useful in enabling a small child to orient and/or reposition himself in a desired manner, as the child may otherwise struggle to coordinate his movements based on the image presented at the presentation component 11 (e.g., if the image presented corresponds directly to the image captured, rather than corresponding to a mirror image of the image captured, then as the user moves to the user's left, the image of the user that is presented to the user will move to the user's right; thus, the user will have to coordinate his movements, accordingly).

Figure 3:
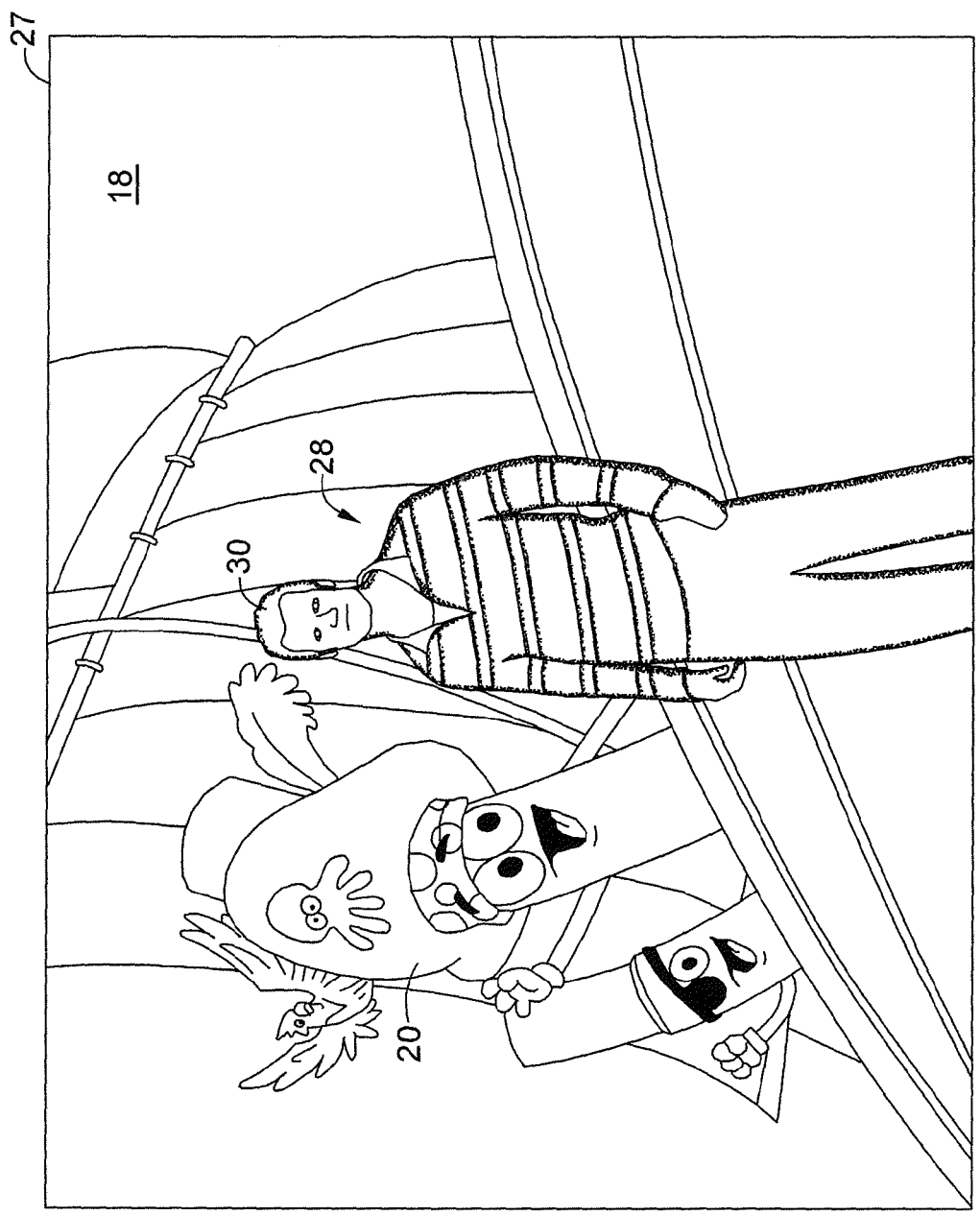
FIG. 3 is a front view of an exemplary presentation of a colorable image of a user against a colorable background, in accordance with an embodiment of the invention.

In embodiments, based on the filtered real-time image of the user 22, a colorable image of the user against the colorable background 18 is generated. FIG. 3 provides a perspective view of an exemplary presentation 26 of such a colorable image 27. The colorable image 27 includes a colorable image of the user 28 against the colorable background 18. The colorable image of the user 28 includes de-saturated features, such as the de-saturated feature 30 corresponding to the feature 24 of FIG. 2. As illustrated by the de-saturated feature 30, as well as other de-saturated features included in the colorable image of the user 28, generating the colorable image of the user 28 may include converting shapes of various colors and/or patterns into white shapes with black edges, such that the shapes are colorable. For example, the shirt of the user 14 includes solid, dark stripes. In the colorable image of the user 22, these stripes are converted to an outline of the stripes, such that the stripes may be colored any color that is desired. An exemplary de-saturating process for achieving this effect will be discussed below with respect to FIG. 4. The colorable image 27 may be presented in real time and/or as a static image.

In some embodiments, an input indicating a command to generate the colorable image of the user 28 against the colorable background 18 may be received. For example, a user may push a button at the receiving component 15, thereby indicating a command to generate the colorable image of the user 28. In response to such input, a timing mechanism may begin counting down. At the end of the countdown, a static image, such as an image resembling a digital photograph, of the user 14 may be captured, and that image may be used to generate a static colorable image of the user 28 against the colorable background 18. In further embodiments, the static image of the user 14 may be captured and the static colorable image of the user 28 against the colorable background 18 may be generated in response to a command received from a docent stationed at the interactive environment 10. In this instance, a timing mechanism may not be necessary, as the docent may simply provide the input indicating a command to generate the static colorable image of the user 28 against the colorable background 18 at the desired time.

The static colorable image of the user 28 that is generated may correspond to a static, de-saturated version of a frame from the filtered real-time image of the user 22. In one embodiment, a frame refers to a single image still. In one aspect, the static colorable image may correspond directly to the filtered real-time image of the user 22 against the colorable background 18. In other words, while the filtered real-time image of the user 22 against the colorable background 18 may be presented as a minor image, for purposes of allowing the user 14 to intuitively reposition himself with respect to the colorable background 18, the static colorable image of the user 28 against the colorable background 18 may directly correspond to the filtered real-time image of the user 22 against the colorable background 18, such that it (e.g., said static colorable image) is not a mirror image of the filtered real-time image of the user 22 against the colorable background 18. In this way, the mirror image may guide a user's movements for purposes of properly positioning the user prior to the generation of the static colorable image, but such mirror image effect is not included in the static colorable image of the user 28 that is generated.

The static colorable image of the user 28 against the selected background 18 may be automatically printed in response to a user input. For example, the static colorable image 27 may be presented at the presentation component 11 for user review. Upon reviewing the static colorable image 27, a user may determine whether or not the static colorable image 27 is acceptable to the user. If the static colorable image 27 is acceptable, the user may provide an input corresponding to a print command. The static colorable image 27 may then be automatically printed, such that no subsequent user input is needed in order for the static colorable image 27 to print. If the static colorable image 27 is not acceptable to the user, the user may provide an input corresponding to a "cancel" command, a "retake" command, or another command that does not result in the automatic printing of the static colorable image 27. Additionally or alternatively, such input may be provided by a docent stationed at the interactive environment 10.

As mentioned above, the colorable image 27 may also be presented in real time, such that the presented image resembles a live coloring book page. For example, an image presented at the presentation component 11 may include a real-time colorable image of the user 28 against the colorable background 18, such as a live video image of the colorable image of the user 28 that corresponds to the live movements, orientation, and/or positioning of the user 14. In embodiments, a minor image of the real-time colorable image of the user 22 against the colorable background 18 is presented on the presentation component 11. As mentioned above, this mirror image presentation may allow the user to orient and/or reposition himself, using the image presented on the presentation component 11 as a mirror to guide his movements.

In embodiments where the real-time image presented on the presentation component 11 includes the real-time colorable image of the user 28 against the colorable background 18, a user input indicating a command to capture a static colorable image of the user 28 against the colorable background 18 may be received. Such static colorable image may correspond directly to a frame from the real-time colorable image of the user 28 against the colorable background 18. Any minor image effect included in the real-time presentation of the colorable image may be omitted from the static colorable image. As mentioned above, the command to capture a static colorable image may be provided in conjunction with a timing mechanism. Additionally or alternatively, such input may be provided by a docent stationed at the interactive environment 10. Also as mentioned above, the static colorable image may be presented for user review and automatically printed in response to a user input, such as a user input from the user 14 or a docent stationed at the interactive environment 10.

Figure 4:
FIG. 4 is a front view of an exemplary presentation of a colorable image of a first user and a colorable image of a second user against a colorable background, in accordance with an embodiment of the invention.

Turning now to FIG. 4, an exemplary presentation 32 of a colorable image 33 is provided. The colorable image 33 includes a colorable image of a first user 38 and a colorable image of a second user 40 against a colorable background 34. The colorable background 34 includes colorable elements such as the colorable element 36. As mentioned above, generating the colorable image of the first user 38 and the colorable image of the second user 40 may include converting shapes of various colors and/or patterns into white shapes with black edges, such that the shapes are colorable. For example, a solid, colored sweater may be converted into a white shape with black edges, as illustrated at the colorable image of the second user 40. Similarly, the colorable image of the first user 38 includes de-saturated shapes corresponding to a pattern on the shirt of the first user. These de-saturated effects may be achieved by a de-saturating process that includes a number of steps. For example, the process may include the steps outlined below.

At one step, a gray-scale image may be generated. For example, a gray-scale image corresponding to a filtered real-time image of a user may be generated. Then, colors associated with the gray-scale image may be inverted to provide an inverted image of the gray scale image. For example, an object that is dark gray in the gray-scale image may correspond to an object that is light gray in the inverted image. The gray-scale image and the inverted image of the gray-scale image may then be merged. This merged image may then be blurred, and a level of contrast associated with the blurred image may be enhanced. For example, enhancing the blurred image might include increasing the level of contrast, in further embodiments. This de-saturation process is only one exemplary process that may be employed to generate the colorable image of the user. Other processes are included within the scope of this invention. Such other processes may include additional steps, or fewer steps, as compared to those discussed above. De-saturating processes may be applied to a real-time image and/or a static image to create a real-time and/or static colorable image.

Figure 5:
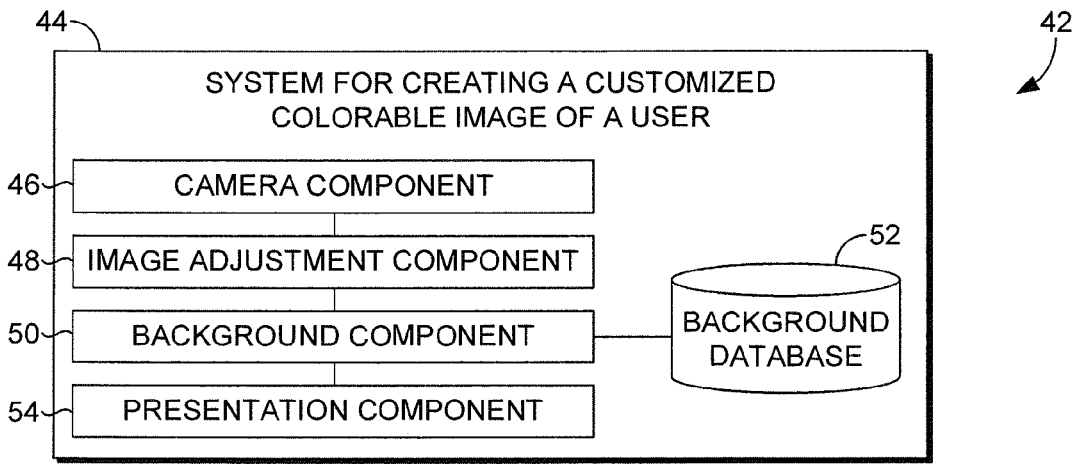
FIG. 5 is a block diagram of an exemplary system for creating a customized, colorable image of a user, in accordance with an embodiment of the invention.

Turning now to FIG. 5, an exemplary environment 42 including an interactive system 44 for creating a customized colorable image of a user is illustrated. As mentioned, the exemplary environment 42 may be integrated into an interactive exhibit in which users create coloring pages that include colorable images of the users. The system may include a camera component 46 for capturing a real-time image of a user positioned in association with a predetermined background, as described above with respect to FIGS. 1A-4. The system 44 may further include a presentation component 54 for presenting a real-time colorable image of the user against a colorable background, also as described above with respect to FIGS. 1A-4. The presentation component 54 may further be configured to present an altered real-time image corresponding to a mirror image of the real-time colorable image of the user against the colorable background, as well as to present a static colorable image of the user against the colorable background that corresponds directly to a frame from the real-time colorable image of the user against the colorable background. In some embodiments, the colorable background may be a selected colorable background that corresponds to a received indication.

An image adjustment component 48 may be included for generating the real-time colorable image of the user. In embodiments, the image adjustment component 48 includes a filtering mechanism for filtering an image of the predetermined background out of the real-time image of the user, as well as a de-saturation mechanism for de-saturating the real-time image of the user. In further embodiments, the image adjustment component 48 performs a de-saturating process including the steps described above with respect to FIG. 4. The image adjustment component 48 may additionally be optimized according to any number of conditions in the system 44, such that the quality of the colorable image of the user is optimized. For example, the image adjustment component 48 may be optimized to account for a distance between a user and the camera component 46. As mentioned above, the floor may be marked to indicate an optimal position and/or distance for the user with respect to the camera component 46. Such position and/or distance may correspond to the optimization of the image adjustment component 48. The image adjustment component 48 might also be optimized to account for a focus level associated with the camera component 46. Additionally, the image adjustment component 48 could be optimized according to one or more characteristics of the predetermined background. In this way, the image adjustment component 48 may be configured to generate a high-quality colorable image of the user, and may be tailored to the particular conditions included in the environment 42.

The system 44 may further include a colorable background component 50 for providing a colorable background. Such colorable background may be retrieved and/or selected from a background database 52. The background database 52 may store any number of colorable background options, including the background options mentioned above with respect to FIG. 2.

Although not illustrated in the exemplary environment 42 of FIG. 5, the system 44 may include a printing component for printing the static colorable image of the user against the colorable background. Also not illustrated is a receiving component, which may be included for receiving one or more user inputs. For example, the receiving component might receive an input for selecting the colorable background, an input for indicating a command to capture the static colorable image of the user against the colorable background, an input for automatically printing the static colorable image of the user against the colorable background, and/or an input for indicating a command to re-capture the static colorable image of the user against the colorable background (e.g., "retake" the picture). Such inputs may be received from a user and/or from a docent stationed at an interactive environment 10 including the system 44. For example, a first user input might correspond to a selection of a colorable background and a second user input might correspond to an indication of a command to capture the static colorable image of the user against the colorable background, in further embodiments. In yet further embodiments, a third user input might correspond to automatically printing the static colorable image of the user against the colorable background. For example, a user may approve and/or confirm the captured image for printing by a printer, such as a remote printing component that receives and prints the captured static colorable image for printing.

The receiving component may assist in creating an efficient, intuitive, interactive user experience, which may be particularly useful when the system 44 is included in an exhibit visited by a high volume of users. For example, the receiving component may include one or more buttons configured to receive the user inputs described above. In embodiments, four buttons are provided, each of which is configured to receive one of the inputs mentioned above (e.g., one button receives a selection of the colorable background, one button receives a command to capture the static colorable image of the user against the colorable background, one button receives an input for automatically printing the static colorable image of the user against the colorable background, and one button receives a command to re-capture the static colorable image). In further embodiments, two buttons may be provided. The first button may be configured to receive a user input for selecting the colorable background, while the second button may be configured to receive an indication of a command to capture the static colorable image of the user against the colorable background. The first button may further be configured to receive the input for automatically printing the static colorable image, while the second button may further be configured to receive an indication of a command to capture a new static colorable image of the user against the colorable background (e.g., a "retake" button). In embodiments, the first button is green and the second button is red. In this way, the red button may be configured to correspond to commands for capturing the static colorable image (e.g., taking and/or retaking a picture), while the green button may correspond to other commands. By providing a limited number of buttons corresponding to a limited number of straightforward commands, the amount of time required for a single user or group of users to generate a colorable image may be reduced. This may reduce the amount of time that subsequent users spend waiting in line, and may thus assist in managing a flow of traffic at the exhibit.

In particular, providing a single button that, when selected, automatically causes the static colorable image to be printed may reduce the amount of time required to print the colorable image, as compared to a process that requires multiple user inputs before an image is printed. For example, a print dialogue box may require several user inputs in order to navigate through the printing process. The present invention may allow a user to bypass inputs associated with a print dialogue box, and may instead automatically print a colorable image upon receiving a single user input.

A size and/or shape of the buttons may be also be configured to increase the efficiency of the interactive experience. For example, a large, arcade-style button corresponding to a limited number of commands may increase the speed with which a user, such as a small child, moves through the exhibit.

Figure 6:
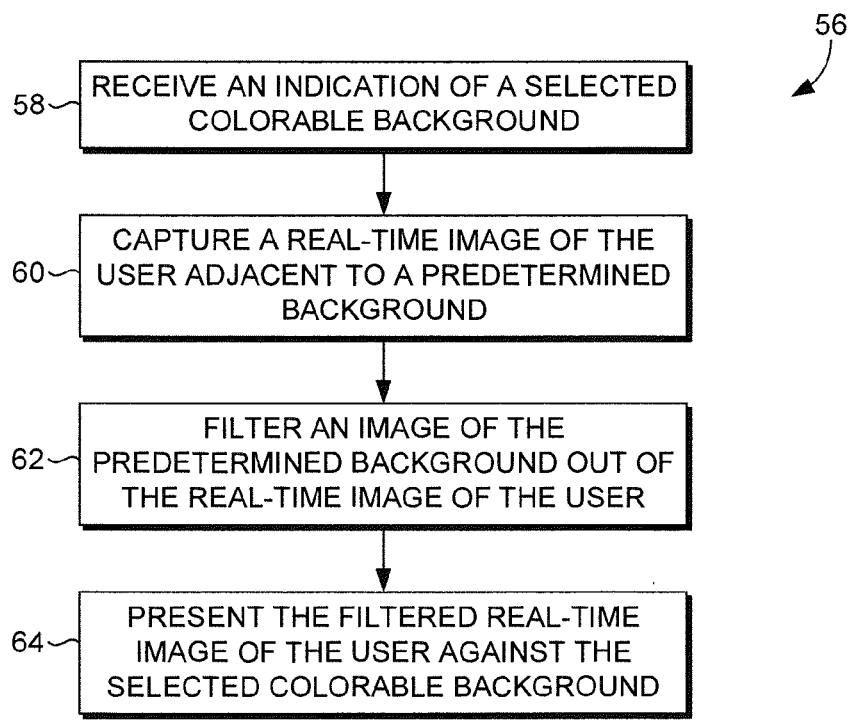
FIG. 6 is an exemplary flow diagram including steps for creating a customized, colorable image of a user, in accordance with an embodiment of the invention.
Figure 7:
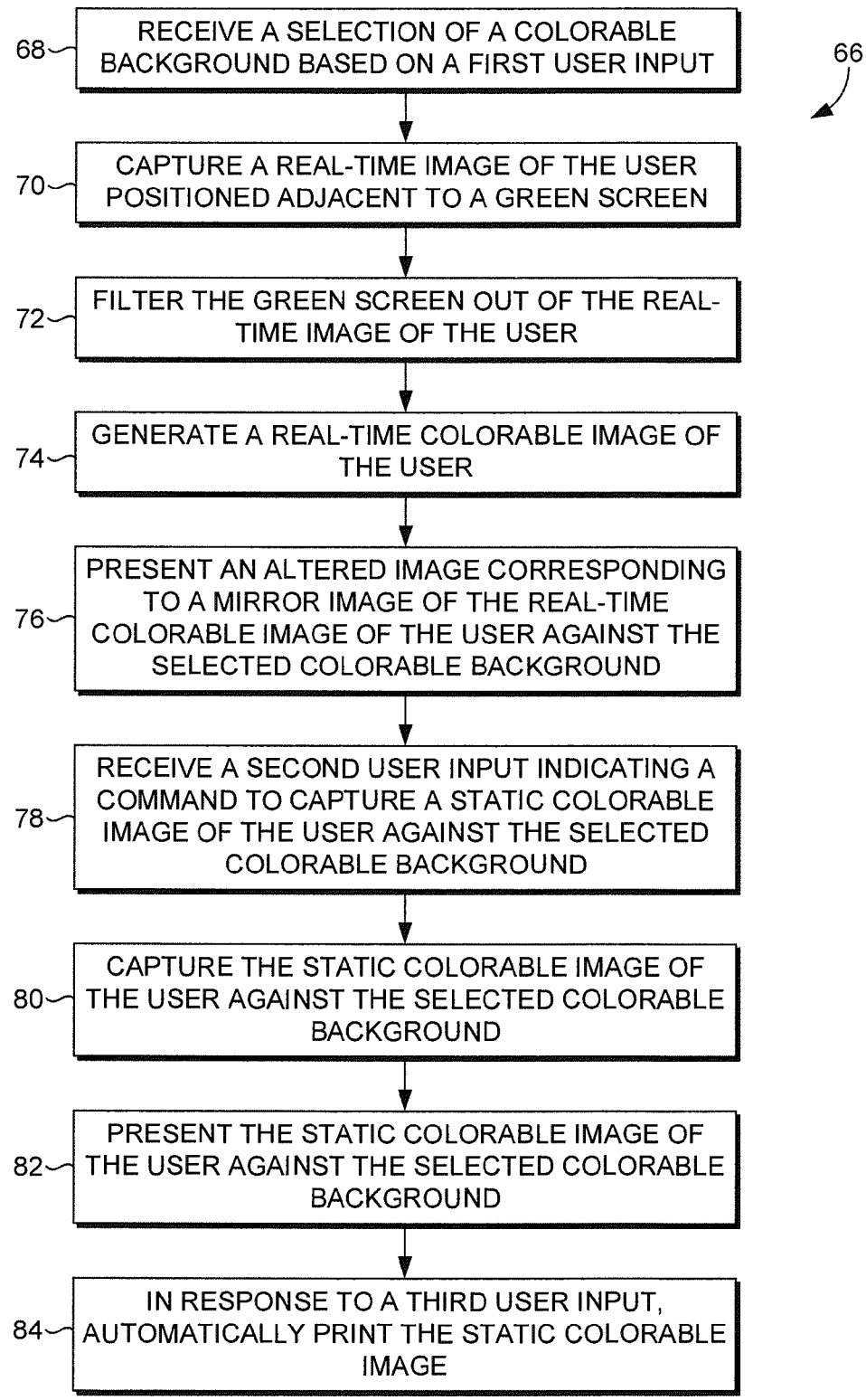
FIG. 7 is an exemplary flow diagram including steps for creating a customized, colorable image of a user, in accordance with an embodiment of the invention.

Turning now to FIGS. 6-7, exemplary methods including steps for providing a customized, colorable image of a user are illustrated. FIG. 6 includes an exemplary block diagram 56 corresponding to such a method. At step 58, an indication of a selected colorable background is received. A real-time image of the user adjacent to a predetermined background is captured at step 60. Then, at step 62, an image of the predetermined background is filtered out of the real-time image of the user to generate a filtered real-time image of the user. The method further includes, at step 64, presenting the filtered real-time image of the user against the selected colorable background.

FIG. 7 illustrates an exemplary block diagram 66 including a number of steps for providing a customized, colorable image of a user. At step 68, a selection of a colorable background is received based on a first user input. A real-time image of the user positioned adjacent to a green screen is captured at step 70. In embodiments, the green screen corresponds to a predetermined background. Then, at step 72, the green screen is filtered out of the real-time image of the user. This filtering may provide a filtered real-time image of the user. Based on the filtered real-time image of the user, at step 74, a real-time colorable image of the user is generated. Then, based on the real-time colorable image of the user and the received selection of the colorable background, an altered image corresponding to a mirror image of the real-time colorable image of the user against the selected colorable background is presented in real time at step 76. At step 78, a second user input indicating a command to capture a static colorable image of the user against the selected colorable background is received. The static colorable image of the user against the selected colorable background is captured at step 80. In further embodiments, the method may include generating the static colorable image of the user against the selectable colorable background. Generating a static colorable image of the user against the selectable background may be based on the filtered real-time image of the user and the selectable background, in some embodiments. Continuing, the method further includes presenting, at step 82, the static colorable image of the user against the selected colorable background, where the static colorable image corresponds directly to the real-time colorable image of the user against the selected colorable background. In some embodiments, the method may further include presenting a minor image of the filtered real-time image of the user against the selectable colorable background, in real-time. Finally, at step 84, the static colorable image is automatically printed in response to a third user input.

Figure 8:
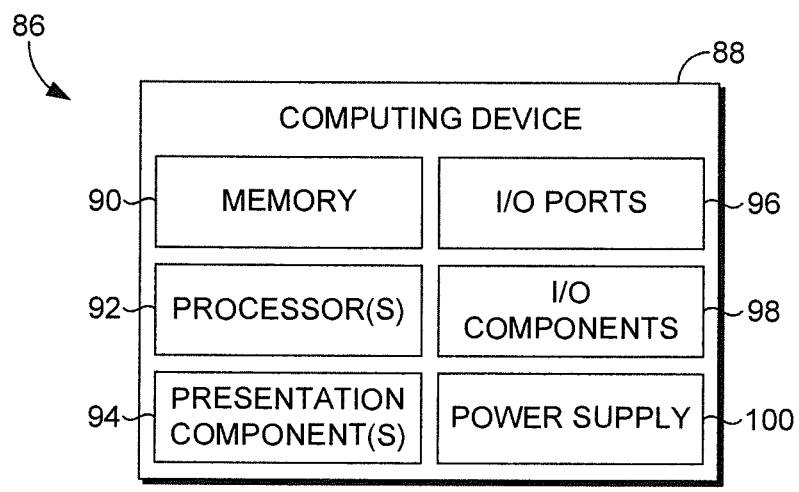
FIG. 8 is an exemplary computing device for use in creating a customized, colorable image of a user, in accordance with an embodiment of the invention.

Referring finally to FIG. 8, an exemplary operating environment 86 in which embodiments of the present invention may be implemented is described below to provide a general context for various aspects of the present invention. Exemplary operating environment 86 includes a computing device 88, which is but one example of a computing environment for use with the present invention. The computing device 88 is not intended to suggest any limitation as to the scope of use or functionality of embodiments of the invention, and should not be interpreted as having any dependency or requirement relating to any one component nor any combination of components illustrated.

Embodiments of the invention may be described in the general context of computer code or machine-useable instructions, including computer-useable or computer-executable instructions such as program modules, being executed by the computing device 88. The computing device 88 typically includes a variety of computer-readable media, which may be any available media that is accessible by the computing device 88, such as computer storage media that stores computer-executable instructions for execution by the computing device 88.

As shown in the example of FIG. 8, the computing device 88 may include the following components: a memory 90, one or more processors 92, one or more presentation components 94, one or more input/output (I/O) ports 96, one or more I/O components 98, and an illustrative power supply 100. As will be understood, the components of exemplary computing device 88 may be used in connection with one or more embodiments of the invention. In embodiments, computing device 88 may include fewer components than those depicted in FIG. 8, or other components in addition to those depicted in FIG. 8.

Embodiments of the memory 90 include computer-storage media in the form of volatile and/or nonvolatile memory that may be removable, non-removable, or a combination thereof. The computing device 88 may also include one or more processors 92 that read data from various entities such as the memory 90 or the I/O components 98. The memory 90 may be used to store the background database 52 of FIG. 5. The presentation component(s) 94 may be configured to present data indications to a user or other device, such as a display device, speaker, printing component, vibrating component, lighting component, and the like. In embodiments, the presentation component(s) 94 includes the presentation component discussed with respect to FIGS. 1A-7. In further embodiments, the I/O ports 96 allow the computing device 88 to be logically coupled to other devices, while the I/O components 98 may include a camera (e.g., the camera component discussed with respect to FIGS. 1A-7), touch screen, microphone, joystick, game pad, satellite dish, scanner, printer, wireless device, and a controller, such as a stylus, a keyboard and a mouse, a natural user interface (NUI), a receiving component (e.g., the receiving component discussed with respect to FIGS. 1A-7) and the like.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for providing a customized, colorable image of a user, the method comprising:
   receiving an indication of a selected colorable background;
   capturing a real-time image of the user, the user adjacent to a predetermined background;
   filtering an image of the predetermined background out of the real-time image of the user to generate a filtered real-time image of the user;
   presenting the filtered real-time image of the user against the selected colorable background; and
   generating a real-time colorable image of the user, wherein generating the real-time colorable image of the user includes:
      generating a gray-scale image corresponding to the filtered real-time image of the user;
      inverting colors associated with the gray-scale image to provide an inverted image of the gray-scale image; and
      merging the gray-scale image and the inverted image of the gray-scale image to provide a merged image.

2. The method of claim 1, wherein the selected colorable background is selected in response to a first user input.

3. The method of claim 2, further comprising:
   receiving a second user input indicating a command to generate a static colorable image of the user against the selected colorable background;
   based on the filtered real-time image of the user and the selected colorable background, generating the static colorable image of the user against the selected colorable background;
   presenting the static colorable image of the user against the selected colorable background; and
   in response to receiving a third user input, automatically printing the static colorable image of the user against the selected colorable background.

4. The method of claim 3, wherein the presenting the filtered real-time image of the user against the selected colorable background comprises presenting, in real time, a mirror image of the filtered real-time image of the user against the selected colorable background.

5. The method of claim 4, wherein the static colorable image of the user against the selected colorable background corresponds directly to the filtered real-time image of the user against the selected colorable background.

6. The method of claim 1, wherein the predetermined background is a green screen.

7. The method of claim 1, further comprising:
   presenting the real-time colorable image of the user against the selected colorable background.

8. The method of claim 7, wherein the presenting the real-time colorable image of the user against the selected colorable background comprises presenting, in real time, a mirror image of the real-time colorable image of the user against the selected colorable background.

9. The method of claim 8, further comprising:
   receiving a second user input indicating a command to capture a static colorable image of the user against the selected colorable background;
   presenting the static colorable image of the user against the selected colorable background, the static colorable image corresponding directly to the real-time colorable image of the user against the selected colorable background; and
   in response to receiving a third user input, automatically printing the static colorable image of the user against the selected colorable background.

10. The method of claim 1, wherein the generating the real-time colorable image of the user further comprises de-saturating the filtered real-time image of the user by a process comprising:
   blurring the merged image to provide a blurred image; and
   enhancing a level of contrast associated with the blurred image.

11. An interactive system for creating a customized, colorable image of a user, the system comprising:
   a camera component for capturing a real-time image of the user positioned in association with a predetermined background;
   an image adjustment component for generating a real-time colorable image of the user, wherein the image adjustment component performs, via a processor:
      generating a gray-scale image corresponding to the real-time image of the user,
      inverting colors associated with the gray-scale image to provide an inverted image of the gray-scale image, and
      merging the gray-scale image and the inverted image of the gray-scale image to provide a merged image;
   a colorable background component for providing a colorable background: and
   a presentation component for presenting the real-time colorable image of the user against the colorable background.

12. The system of claim 11, wherein the image adjustment component comprises:
   a filtering mechanism for filtering an image of the predetermined background out of the real-time image of the user; and
   a de-saturation mechanism for de-saturating the real-time image of the user.

13. The system of claim 11, wherein the presentation component is further configured to present a static colorable image of the user against the colorable background, the static colorable image corresponding to the real-time colorable image of the user against the colorable background.

14. The system of claim 13, further comprising:
   a printing component for printing the static colorable image of the user against the colorable background.

15. The system of claim 13, further comprising:
   a receiving component for receiving one or more of:
      a first user input for selecting the colorable background;

a second user input for indicating a command to capture the static colorable image of the user against the colorable background; and a third user input for automatically printing the static colorable image of the user against the colorable background.

16. The system of claim 11, wherein the image adjustment component is optimized for at least one of a distance between the user and the camera component, a focus level associated with the camera component, and one or more characteristics of the predetermined background.

17. The system of claim 11, wherein the predetermined background is a green screen.

18. The system of claim 11, wherein the image adjustment component performs, via the processor, a process comprising:

blurring the merged image to provide a blurred image; and enhancing a level of contrast associated with the blurred image.

19. The system of claim 11, wherein the presentation component is further configured to:

present an altered real-time image corresponding to a mirror image of the real-time colorable image of the user against the colorable background; and present a static colorable image directly corresponding to the real-time colorable image of the user against the colorable background.

20. A method for providing a customized, colorable image of a user, the method comprising:

receiving a selection of a colorable background based on a first user input;

capturing a real-time image of the user positioned adjacent to a green screen;

filtering the green screen out of the real-time image of the user to provide a filtered image of the user;

based on the filtered image of the user, generating a real-time colorable image of the user, wherein generating the real-time colorable image of the user comprises:

generating a gray-scale image corresponding to the filtered image of the user, inverting colors associated with the gray-scale image to provide an inverted image of the gray-scale image, and merging the gray-scale image and the inverted image of the gray-scale image to provide a merged image;

based on the real-time colorable image of the user and the received selection of the colorable background, presenting, in real time, an altered image corresponding to a mirror image of the real-time colorable image of the user against the selected colorable background;

receiving a second user input indicating a command to capture a static colorable image of the user against the selected colorable background;

capturing the static colorable image of the user against the selected colorable background;

presenting the static colorable image of the user against the selected colorable background, the static colorable image corresponding directly the real-time colorable image of the user against the selected colorable background; and in response to a third user input, automatically printing the static colorable image.

* * * * *

UNITED STATES PATENT AND TRADEMARK OFFICE
CERTIFICATE OF CORRECTION

PATENT NO.         : 9,667,936 B2                                    Page 1 of 1
APPLICATION NO.    : 14/701020
DATED              : May 30, 2017
INVENTOR(S)        : Brian Edward Nemeckay and Kyle Kelly It is certified that error appears in the above-identified patent and that said Letters Patent is hereby corrected as shown below:

In the Specification
Column 2, Line 58: "minor" should read --mirror--.
Column 4, Line 60: "minor" should read --mirror--.
Column 5, Line 4: "minor" should read --mirror--.
Column 5, Line 6: "minor" should read --mirror--.
Column 5, Line 67: "minor" should read --mirror--.
Column 6, Line 39: "minor" should read --mirror--.
Column 6, Line 54: "minor" should read --mirror--.
Column 10, Line 16: "minor" should read --mirror--.

In the Claims
Column 12, Line 46: replace the ":" after "background" with a --;--.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*